(12) United States Patent
Iskra et al.

(10) Patent No.: US 12,715,322 B2
(45) Date of Patent: Aug. 25, 2026

(54) HEATABLE CHARGING SOCKET

(71) Applicant: TE Connectivity Germany GmbH, Bensheim (DE)

(72) Inventors: Mike Iskra, Bensheim (DE); Ralf Schwan, Bensheim (DE); Dominik Heiss, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 502 days.

(21) Appl. No.: 18/360,044

(22) Filed: Jul. 27, 2023

(65) Prior Publication Data

US 2024/0034162 A1 Feb. 1, 2024

(30) Foreign Application Priority Data

Jul. 27, 2022 (DE) ........................ 102022118827.2

(51) Int. Cl.
*H01R 13/533* (2006.01)
*B60L 53/16* (2019.01)

(52) U.S. Cl.
CPC ............ *B60L 53/16* (2019.02); *H01R 13/533* (2013.01); *H01R 2201/26* (2013.01)

(58) Field of Classification Search
None
See application file for complete search history.

(56) References Cited

U.S. PATENT DOCUMENTS 9,321,364 B1 4/2016 Ashworth et al.
11,203,264 B2 12/2021 Nagel
2019/0126764 A1 5/2019 Fuhrer
2019/0217713 A1* 7/2019 Salter ........................ B60L 5/02
2021/0078419 A1 3/2021 Lyon

FOREIGN PATENT DOCUMENTS

CN 204304097 U 4/2015
CN 110247246 A 9/2019
CN 209738837 U * 12/2019
CN 212950215 U 4/2021
DE 102009057460 A1 6/2011
DE 102017004295 A1 * 11/2017 ............. B60L 53/16
DE 102016122009 A1 5/2018
DE 102011119495 B4 11/2021
DE 102021118380 A1 1/2023
FR 3079784 A1 10/2019
JP H11074032 A 3/1999
JP 2018206771 A 12/2018

OTHER PUBLICATIONS

Extended European Search Report dated Dec. 7, 2023, corresponding to Application No. 23187409.0-1201, 12 pages.
Korean Office Action dated Nov. 17, 2024, corresponding to Application No. 10-2023-0097405, 6 pages.
Japanese Office Action dated Sep. 10, 2024 with English translation, corresponding to App. No. 2023-119772, 17 pages.
Office Action from the Deutsches Patent- und Markenamt dated Apr. 28, 2023, corresponding to Application No. 10 2022 118 827.2, 6 pages.
Indian Examination Report dated Mar. 24, 2026, corresponding to Application No. 202344049671, 7 pages.

* cited by examiner

*Primary Examiner* — Tho D Ta
(74) *Attorney, Agent, or Firm* — Barley Snyder

(57) ABSTRACT

A charging socket of an electric or hybrid vehicle is adapted to connect to a charging plug. The charging socket comprises a socket wall, and at least one heating module shaft extending into the socket wall and adapted to receive a heating module.

19 Claims, 4 Drawing Sheets

27
17
45
19, 19a
20
1, 3
23
19d
31
39
41
33
43
19b
21
19c 1
23
45, 47
45, 47
17
19
17
19
35
35
43
43
21

HEATABLE CHARGING SOCKET

CROSS-REFERENCE TO RELATED APPLICATIONS

This application claims the benefit of German Patent Application No. 102022118827.2, filed Jul. 27, 2022, the whole disclosure of which is incorporated herein by reference.

FIELD OF THE INVENTION

Embodiments of the present disclosure relate to a charging socket of an electric or hybrid vehicle for connection to a charging plug, and a kit for providing the same.

BACKGROUND

When charging electric or hybrid vehicles at temperatures below the freezing point, there is a risk of the charging plug becoming iced over and frozen to the charging socket when plugged in after a charging process has been completed. This is due to the fact that during the charging process, heat is generated at the connection between the charging plug and charging socket by the flowing charging current. This heat in turn melts snow or ice on the vehicle, for example. After the charging process is complete, the charging plug and charging socket cool down and melted water can freeze the charging socket and charging plug together so that the charging plug can no longer be pulled out of the charging socket. Depending on the region in which the electric or hybrid vehicle is used, such icing can occur with varying frequency, especially in the winter months.

Thus, it is an object of the present invention to improve existing charging sockets to prevent icing between the charging plug and charging socket and/or to eliminate existing icing.

SUMMARY

According to an embodiment of the present disclosure, a charging socket of an electric or hybrid vehicle is adapted to connect to a charging plug. The charging socket comprises a socket wall, and at least one heating module shaft extending into the socket wall and adapted to receive a heating module.

A charging socket assembly according to another embodiment of the present disclosure includes a charting socket and a heating module. The charging socket is adapted to be fitted to an electric or hybrid vehicle and includes a contact body defining a plurality of contact openings, a socket wall surrounding the contact body, and at least one heating module shaft extending into at least one of the contact body or the socket wall. The heating module is arranged in the at least one heating module shaft.

BRIEF DESCRIPTION OF THE DRAWINGS

The invention will now be described by way of example with reference to the accompanying Figures, of which.

DETAILED DESCRIPTION OF THE EMBODIMENTS

Figure 1:
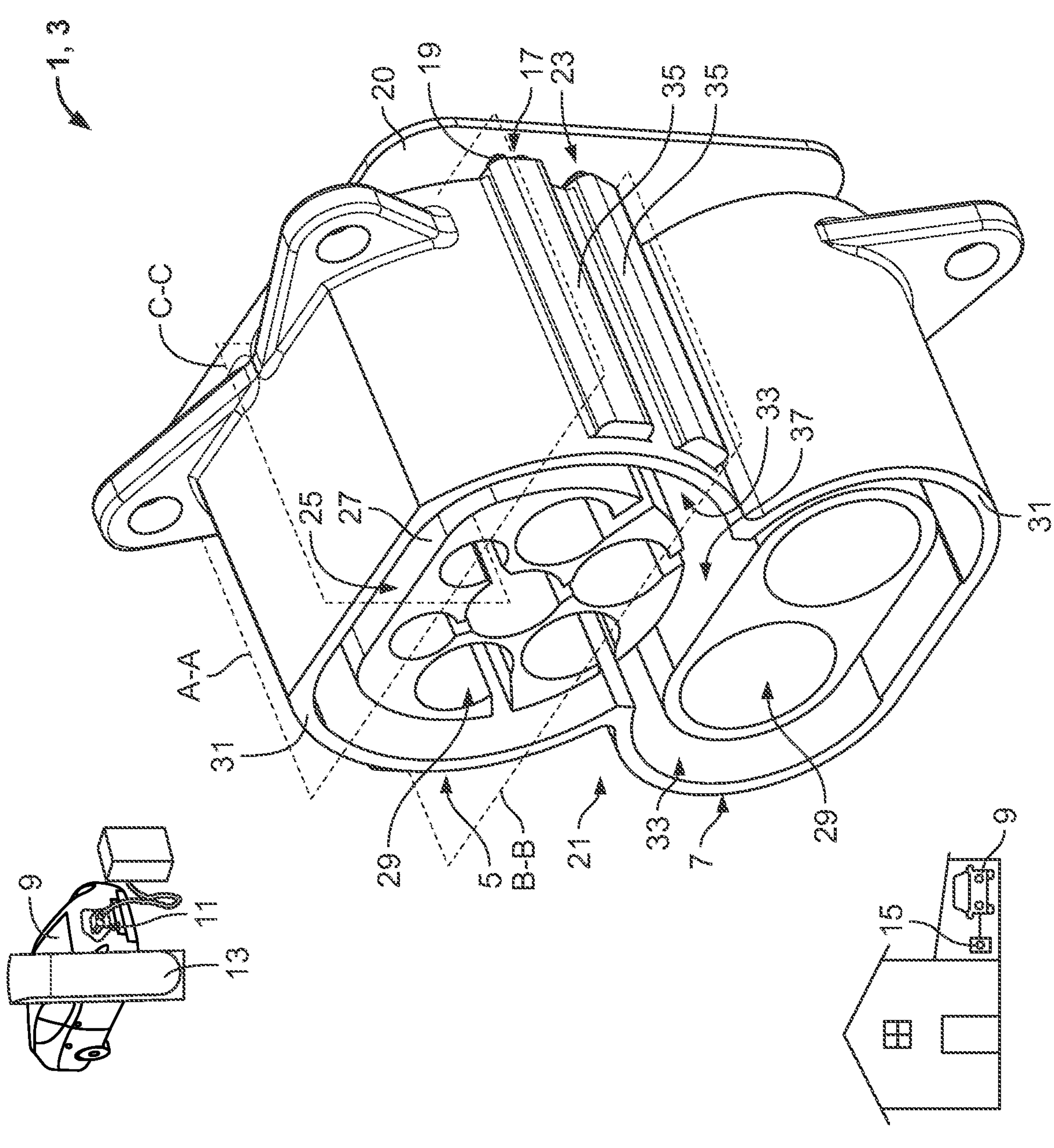
FIG. 1 is a schematic representation of the charging socket according to the invention in a perspective front view.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
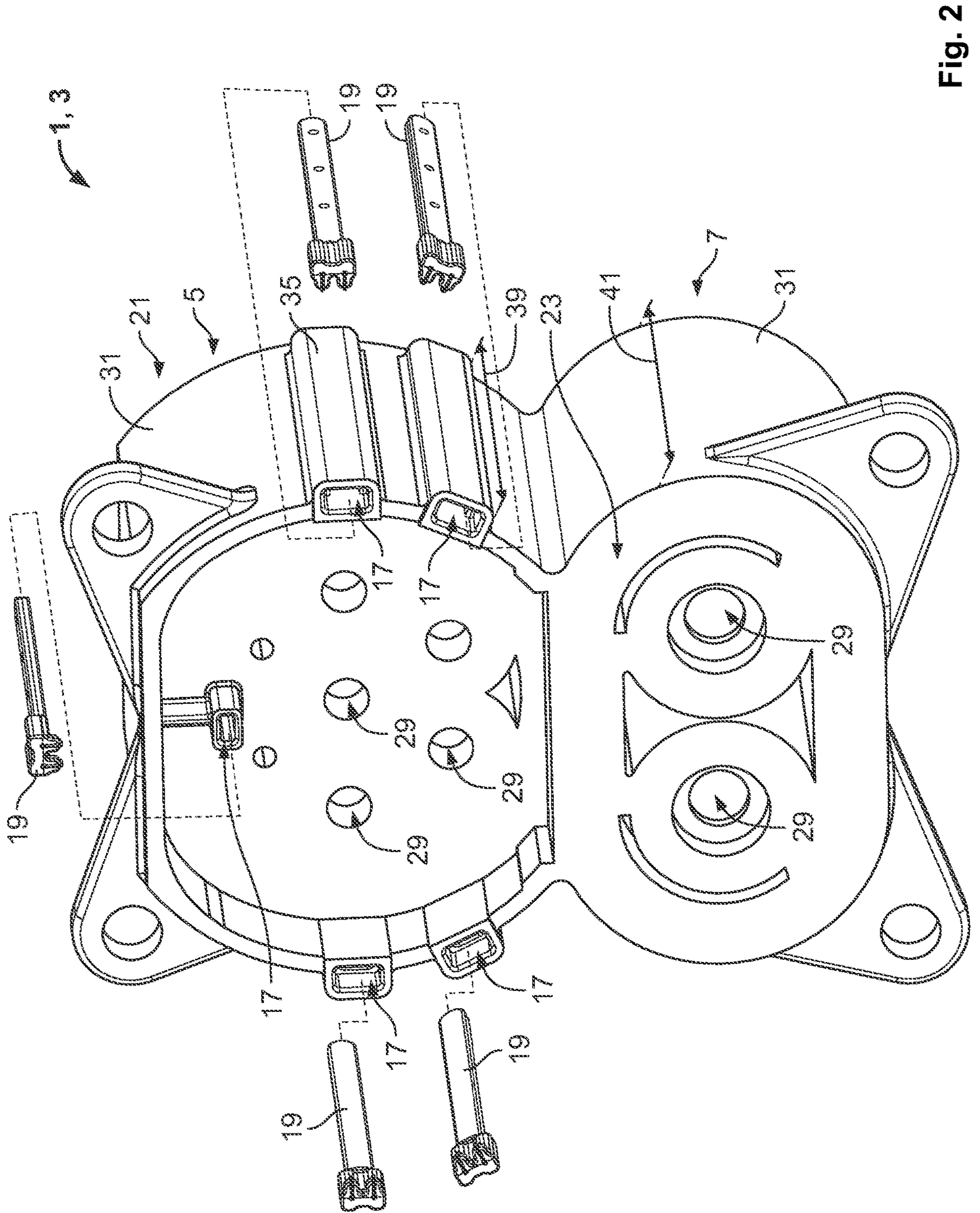
FIG. 2 is a schematic exploded view of the charging socket according to the invention in a perspective rear view.

In FIG. 1 and FIG. 2, a charging socket 1 is shown in a perspective view from different directions. The charging socket 1 is adapted as a combined charging socket 3, i.e., it has an AC charging socket 5 and a DC charging socket 7. The charging socket 1 is used in an electric or hybrid vehicle 9 to connect to a charging plug 11. This is possible, for example, at a publicly accessible charging station 13 or at a private domestic wall box 15.

The configuration of the charging socket 1 shown has five heating module shafts 17, which can be seen more clearly in FIG. 2. Each heating module shaft 17 is adapted to receive a heating module 19. In FIG. 1, the heating modules 19 are received in a respective heating module shaft 17, whereas in FIG. 2 the heating modules 19 are shown removed from the respective heating module shaft 17. Furthermore, a printed circuit board 20 is shown in FIG. 1, via which the heating modules 19 can be supplied with electrical power. This circuit board 20 is not shown in FIG. 2.

The following explanations refer to both FIG. 1 and FIG. 2.

The charging socket 1 has a front side 21 for inserting the charging plug 11 and a rear side 23 facing away from the front side 21. In the configuration of the charging socket 1 shown, the heating module shafts 17 extend from the rear side 23 to the front side 21 of the charging socket 1. As can be seen in FIG. 2, the heating module shafts 17 open toward the rear side 23.

The charging socket 1 shown meets the requirements in terms of geometry and connection assignment that are placed on an electric or hybrid vehicle 9. For example, a flattened shape 25 of a contact body 27 (to prevent incorrect plugging in of a charging plug 11), its orientation and positioning with respect to the DC charging socket 7 are specified.

The contact body 27 has contact receptacles 29 in which, in the assembled state of the charging socket 1, electrical contacts are received for contacting mating contacts of the charging plug 11. The AC charging socket 5 has seven such contact receptacles 29, and the DC charging socket 7 has two. For the sake of clarity, not all contact receptacles 29 are provided with a reference sign.

The charging socket 1 has a socket wall 31 which surrounds both the contact body 27 of the AC charging socket 5 and the contact body 27 of the DC charging socket 7, while forming an annular gap 33. The annular gaps 33 formed around the two contact bodies 27 merge between the AC charging socket 5 and the DC charging socket 7. The mating plug 11 can thus preferably be aligned and/or centered and further received in the annular gap 33. For this purpose, the annular gap 33 and/or the contact body 27 can define the flattened areas 25 which prevent incorrect mating between the charging plug 11 and charging socket 1.

The configuration of the charging socket 1 shown has four elongated, hollow thickenings or protruding portions 35 in the socket wall 31. In other configurations, any number of thickenings 35 may be provided. Likewise, the charging socket 1 can be adapted as an AC charging socket 5 only. In this case, the socket wall 31 completely surrounds the AC charging socket 5 and there is no DC charging socket 7. In this case, the socket wall 31 may extend around the contact body 27 in the lower area 37 of the AC charging socket 5 in a preferably circular arc.

Still referring to FIGS. 1 and 2, in the illustrated exemplary configuration of the charging socket 1, one heating module shaft 17 is located in the contact body 27 of the AC charging socket 5, and four heating module shafts extend from the rear side 23 toward the front side 21 in the thickenings 35 of the socket wall 31 of the AC charging socket. In other configurations (not shown) of the charging socket 1, any number of heating module shafts 17 may be provided in any arrangement on the AC charging socket 5, as well as on the DC charging socket 7. The number and positioning shown is purely exemplary.

Likewise, the corresponding heating modules 19 can be received in the heating module shafts 17 in any combination, or the heating modules 19 can also be omitted. In other words, as many heating modules 19 can be received in the charging socket 1 (preferably one heating module 19 in each of the corresponding heating module shafts 17) as the charging socket 1 has heating module shafts 17.

On the other hand, however, some heating module shafts 17 may be left free, i.e., no heating module 19 may be received in these heating module shafts. In particular, in warmer regions where the electric or hybrid vehicle 9 is to be used, no heating module 19 at all may be received in the charging socket 1. In this case, the heating module shafts 17 are empty.

However, the same charging socket 1 can be used for each application, which can then be equipped with the appropriate number of heating modules 19 to suit the region in which the electric or hybrid vehicle 9 is to be used. Thus, a heating power with which the charging socket 1 prevents icing can be set variably. The charging socket 1 is therefore variable and versatile and saves manufacturing costs.

In the configuration shown, a heating module shaft 17 is arranged in the contact body 27 between two contact receptacles 29. In one embodiment, the heating module shaft 17 is cast into the material of the charging socket 1. The heating module shaft 17 thus forms a shaft-like cavity in a wall of the charging socket 1.

Furthermore, in the configuration shown, four heating module shafts 17 extend from the rear side 23 to the front side 21 in the thickenings 35, that is, in the socket wall 31. All heating module shafts 17 open to the rear side 23, so that a heating module 19 can be inserted into a heating module shaft 17 from the rear side 23 in each case, preferably without play or in a press fit 19*a*.

The heating module shafts 17 extend over a shaft depth 39 (see also FIGS. 3-5) between the rear side 23 and the front side 21 of the charging socket 1. This shaft depth 39 is preferably greater than half of a depth 41 between the rear side 23 and the front side 21. In FIG. 2, the shaft depth 39 is indicated.

In the socket wall 31, the heating module shafts 17 are arranged symmetrically (mirror-symmetrically). In other configurations (not shown), the heating module shafts 17 may be arranged equidistantly on or in the socket wall 31.

The heating module shafts 17 are closed towards the front 21 by a bottom 43. A heating module 19 can be received up to this bottom 43. Preferably, the at least one heating module 19 is received in the respective heating module shaft 17 without play or in a press fit 19*a*. This can be seen, for example, in the sectional views of FIGS. 3, 4 and 5. The sectional views also show that the heating module shaft 19 is adapted to complement the heating module shaft 17. This improves heat transfer from the heating module 19 to the charging socket 1. This structure has the advantage that heat can be introduced into the charging socket 1 via the heating module 19 in all directions perpendicular to the extension of the heating module and, for example, not only on one rear side 23. This is preferred because icing between the charging plug 11 and charging socket 1 occurs at the front side 21 of the charging socket.

A closed heating module shaft 17 can be protected against the entry of foreign bodies and/or water because it is not accessible from outside the electric or hybrid vehicle 9 when the charging socket 1 is installed. If no heating module 19 is inserted in a heating module shaft 17, this can, for example, be inserted subsequently by appropriately trained service personnel in the corresponding heating module shaft, which was previously inaccessible and thus kept free of contamination.

Preferably, at least one heating module shaft 17 is provided both in the contact body 27, here further preferably between at least two contact receptacles 29, and in the socket wall 31, so that both the contact body and the socket wall can be heated. In a further configuration, the charging socket 1 can have the at least one heating module shaft 17 in an upper third of the charging socket in an assembled state, i.e., when this is installed in the electric or hybrid vehicle 9. This is preferred because icing occurs increasingly on the upper side of the connection between the charging plug 11 and the charging socket 1.

Figures 3, 4:
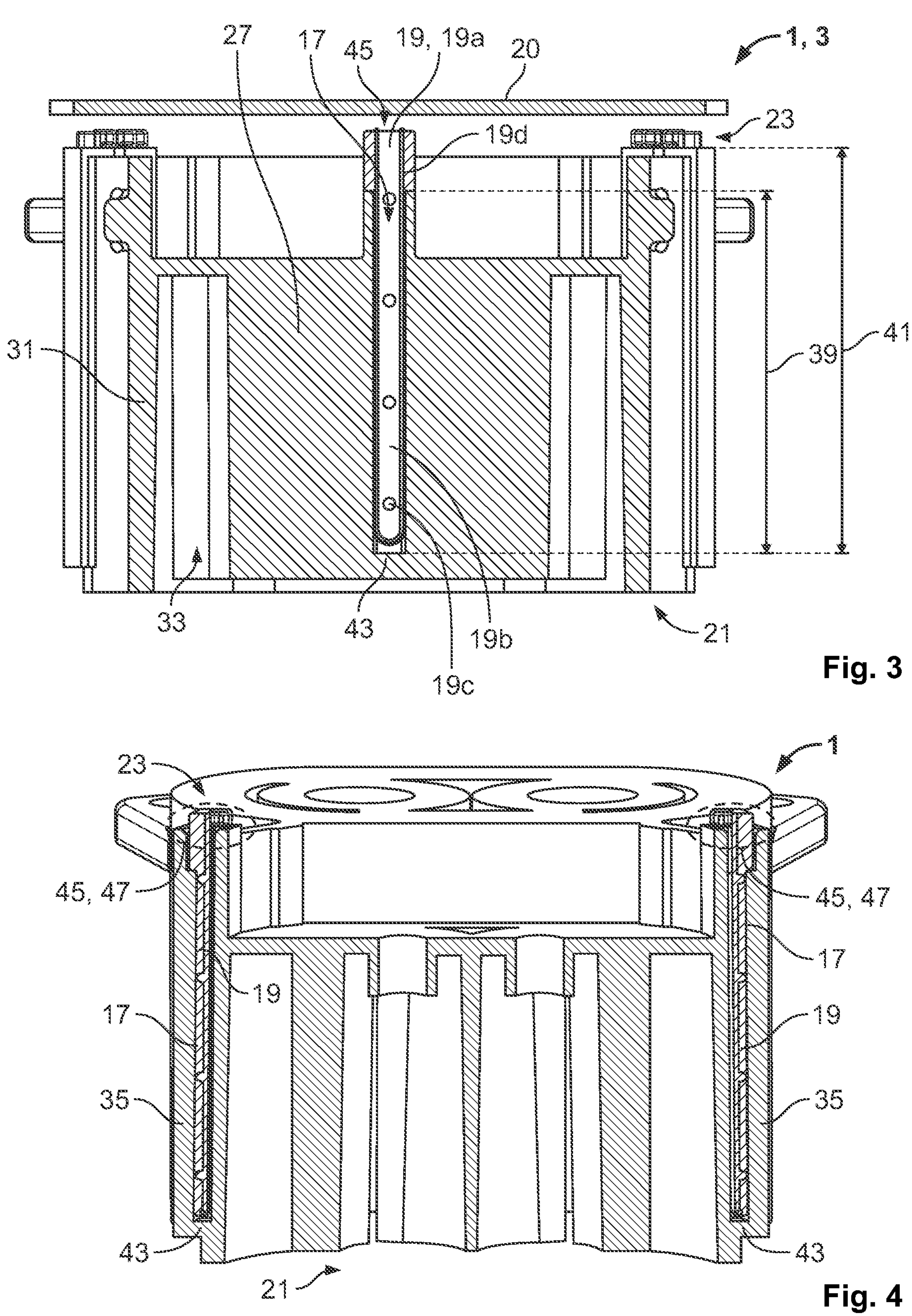
FIG. 3 is a sectional view along the plane A-A shown in FIG. 1.
FIG. 4 is a perspective sectional view along the plane B-B shown in FIG. 1.
Figure 5:
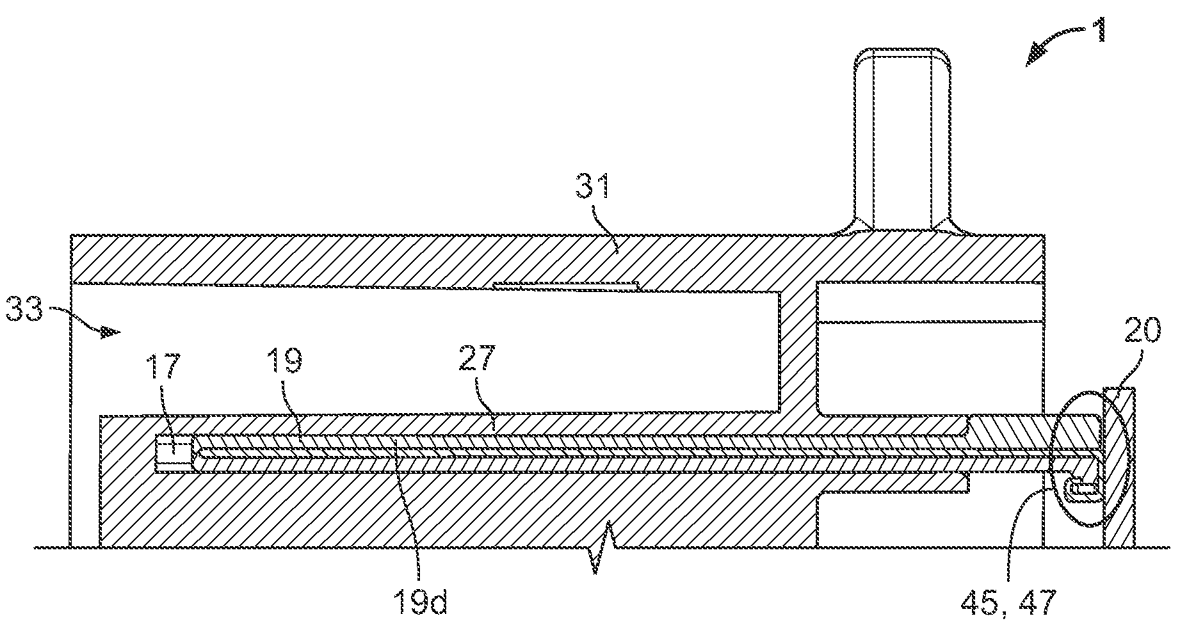
FIG. 5 is an enlarged sectional view along the plane C-C shown in FIG. 1.

FIGS. 3-5 show various sectional views along the planes A-A, B-B and C-C shown in FIG. 1.

Figure 6:
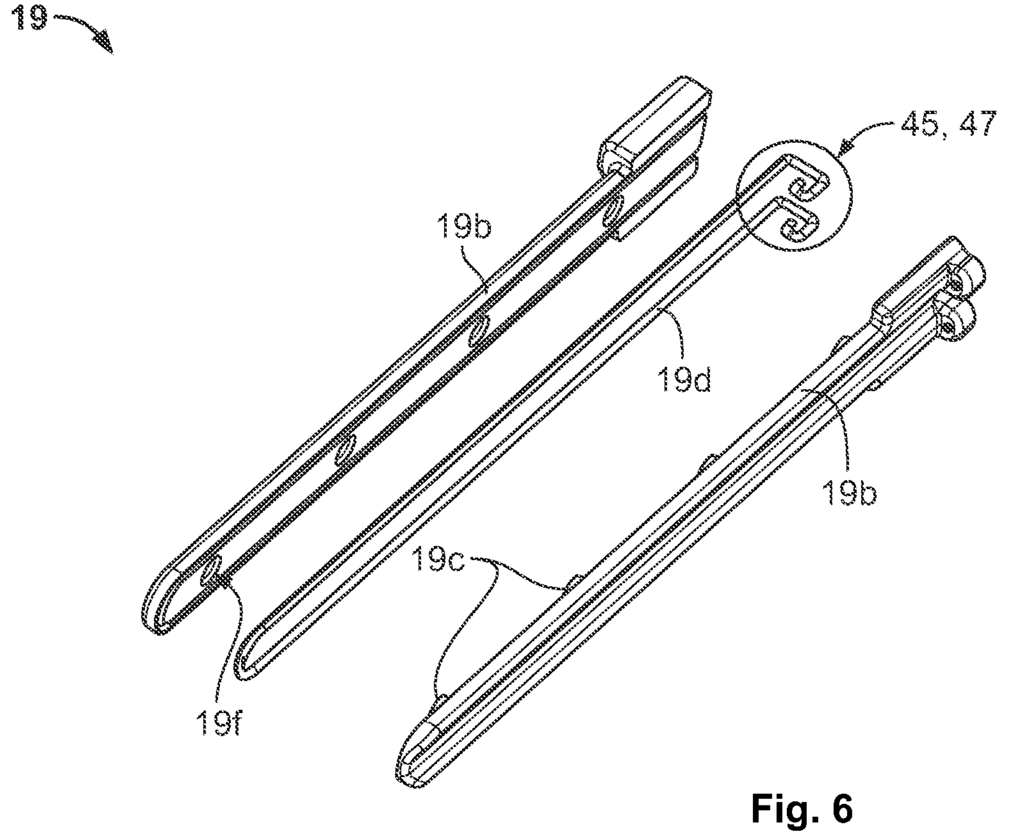
FIG. 6 is an exploded view of a configuration of the heating module according to the invention.

FIGS. 3 and 5 show the heating module 19, which is received in the contact body 27. The heating module 19, which is shown in FIG. 6 in an exploded view, consists of two heating module halves 19*b*, which are connected to each other via any number of connecting elements 19*c* (for example pins) and enclose a heating wire 19*d*. The heating wire 19*d* is accessible only at a contact side 45.

The heating module 19 is inserted into the heating module shaft 17 via a press fit 19*a* and extends almost over the entire shaft depth 39. The bottom 43, which closes the heating module shaft 17 at the front 21 so that the heating module shaft 17 is only accessible from the rear side 23, can also be seen.

In the exploded view of FIG. 6, it is further shown that the connecting elements 19*c* can be fitted into corresponding mating connecting elements 19*f*. Furthermore, it is shown that the heating wire 19*d* has a bend 47 on the contact side 45 of the heating module 19. This ensures the position of the heating wire 19*d* between the two heating module halves 19*b*. Further, a sufficiently large contact area is provided for contacting the printed circuit board 20. This contacting with the printed circuit board 20 is shown schematically in FIG. 5.

In FIG. 4, two of the four heating modules 19 are shown in sectional view. These are received in the thickenings 35 of the socket wall 31 in a press fit 19*a*. The heating module shaft 17 is bounded in each case by the bottom 43, so that the heating module shafts 17 are accessible only from the rear side 23. At this rear side 23, the heating wires 19*d* of the heating module 19 shown are also bent over, i.e., provided with a bend 47, in order to make electrical contact with the printed circuit board 20 (not shown, see FIG. 5).

It should be understood that the DC charging socket 7 is usually used for fast charging of electric or hybrid vehicles, so that the vehicle is used again immediately after the charging process is completed, or the fast charging process is terminated when the vehicle is to be used again, thus it is interrupted at an early stage. In these application cases, icing between the charging plug 11 and charging socket 1 is much less likely than in the case of slower charging via the AC charging socket 5, which is used to charge electric or hybrid vehicles overnight in private households, for example. Here, the risk of icing is significantly greater, as the charging plug 11 remains in the charging socket 1 after the end of the charging process.

Further, as icing can occur in particular at the front of the charging socket, in a particularly preferred configuration a received heating module can have an active area of a first length and a passive area of a second length. In the active area, the heating element generates heat during operation, i.e., when a voltage (preferably controlled and/or regulated by a control unit of the electric vehicle) is applied to it, whereas the heating element in the passive area does not generate any heat during operation. This can be achieved, for example, by the heating element having a higher electrical resistance in the active area than in the passive area, and thus current conduction takes place in the passive area without significant heat loss (this heat loss is used in the active area to heat the charging socket). This can be used in particular to heat an area of the charging socket facing the front side, as icing is more likely to occur at this front side than at the rear side, i.e., in an area of the charging socket facing the vehicle or offset into it. This arrangement has the further advantage that heat only has to be generated at those points of the charging socket that may be affected by icing. This avoids unnecessary energy input in the form of heat in areas of the charging socket that are not affected by icing anyway. This saves electrical energy taken from the energy storage (e.g., from the battery) of the electric or hybrid vehicle.

The charging socket 1 according to the invention can be adapted as a CCS charging socket (combined charging system) and comply with the IEC 62196 standard, for example.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A charging socket of an electric or hybrid vehicle adapted to connect to a charging plug, comprising:
a socket wall; and
at least one heating module shaft extending into the socket wall and adapted to receive a heating module, the at least one heating module shaft is defined by an elongated, hollow protrusion formed on an exterior surface of the socket wall.

2. The charging socket according to claim 1, wherein the charging socket defines an AC charging socket and a DC charging socket, the at least one heating module shaft arranged proximate the AC charging socket.

3. The charging socket according to claim 1, further comprising a front side adapted to receive the charging plug and a rear side facing away from the front side, the at least one heating module shaft extends from the rear side to the front side.

4. The charging socket according to claim 3, wherein the at least one heating module shaft opens towards the rear side.

5. The charging socket according to claim 3, wherein the at least one heating module shaft extends over at least half of a depth between the rear side and the front side of the charging socket.

6. The charging socket according to claim 3, wherein the at least one heating module shaft has, towards the front side, a bottom closing the at least one heating module shaft.

7. The charging socket according to claim 3, further comprising a contact body adapted to receive contact elements and enclosed by the socket wall.

8. The charging socket according to claim 7, wherein an annular gap is defined between the socket wall and the contact body about a perimeter of the contact body.

9. The charging socket according to claim 7, wherein the at least one heating module shaft includes a plurality of heating module shafts, at least one of the plurality of heating modules shafts provided in the contact body, and a plurality of the heating module shafts provided in the socket wall.

10. The charging socket according to claim 1, further comprising a plurality of contact receptacles adapted to receive electrical contacts for contacting mating contacts of the charging plug.

11. The charging socket according to claim 10, wherein the at least one heating module shaft extends between at least two contact receptacles of the plurality of contact receptacles.

12. The charging socket according to claim 1, further comprising a heating module received in the at least one heating module shaft without play or in a press fit.

13. The charging socket according to claim 12, wherein the heating module includes two heating module halves enclosing a heating wire.

14. The charging socket according to claim 13, wherein the heating wire is bent on a free end thereof adjacent an open end of the at least one heating module shaft.

15. A charging socket assembly, comprising:

a charging socket adapted to be fitted to an electric or hybrid vehicle, including:

a contact body defining a plurality of contact openings; and a socket wall surrounding the contact body; and at least one heating module shaft formed in at least one of the contact body or the socket wall; and a heating module arranged in the at least one heating module shaft, the at least one heating module shaft includes a heating module shaft formed in the contact body and a plurality of heating module shafts formed in the socket wall, the heating module shaft formed in the contact body and the plurality of heating module shafts formed in the socket wall extend between a front side of the charging socket adapted to receive the charging plug, and a rear side of the charging socket facing opposite the front side.

16. The charging socket assembly according to claim 15, wherein each of the heating module shafts formed in the contact body and the socket wall opens towards the rear side of the charging socket.

17. The charging socket assembly according to claim 15, wherein the charging socket defines an AC charging socket and a DC charging socket, the at least one heating module shaft arranged proximate the AC charging socket.

18. A charging socket of an electric or hybrid vehicle adapted to connect to a charging plug, comprising:

a socket wall;

at least one heating module shaft extending into the socket wall and adapted to receive a heating module;

a front side adapted to receive the charging plug; and a rear side facing away from the front side, the at least one heating module shaft extends over at least half of a depth between the rear side and the front side of the charging socket.

19. A charging socket of an electric or hybrid vehicle adapted to connect to a charging plug, comprising:

a socket wall;

at least one heating module shaft extending into the socket wall and adapted to receive a heating module;

a front side adapted to receive the charging plug; and a rear side facing away from the front side, the at least one heating module shaft opens towards the rear side and extends from the rear side to the front side.

* * * * *